Aug. 4, 1936.         G. H. HUFFERD ET AL         2,049,502
                       STEERING UNIT JOINT
                       Filed Feb. 26, 1934
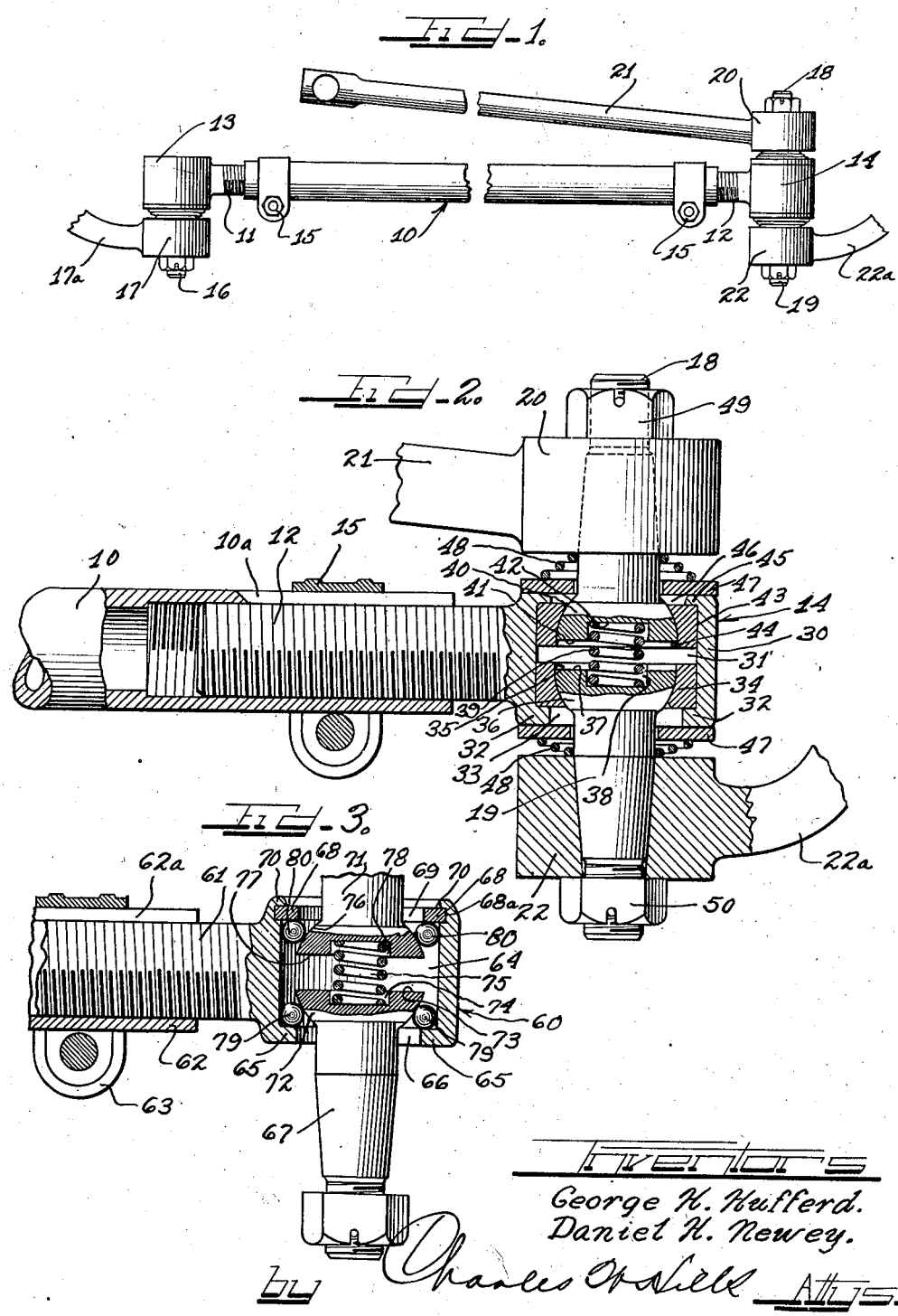
Inventors
George H. Hufferd.
Daniel H. Newey.
by Charles O'Neill Attys.

Patented Aug. 4, 1936

2,049,502

UNITED STATES PATENT OFFICE 2,049,502

STEERING UNIT JOINT

George H. Hufferd and Daniel H. Newey, Detroit, Mich., assignors to Thompson Products, Incorporated, Cleveland, Ohio, a corporation of Ohio Application February 26, 1934, Serial No. 712,903

5 Claims. (Cl. 287—90)

This invention relates to a tie rod joint for automotive vehicles.

More specifically this invention relates to a simple joint construction adapted to connect the tie rod of an automotive vehicle with both the drag link and a front wheel steering arm.

Heretofore steering units for automotive vehicles have required the use of at least three tie rod joints. We have now provided a novel tie rod joint to replace two of the heretofore used tie rod joints.

The tie rod joint of this invention comprises a housing having a stud element extending from each end thereof. The joint is adapted to connect both a front wheel steering arm and a drag link from the steering wheel to a tie rod. A wide latitude of rotary and angular movement is permitted by the joint of this invention and the joint is automatically self-adjusting to compensate for the wear of the bearing parts therein.

It is therefore an object of this invention to provide a steering unit joint for automotive vehicles which is simple in design and automatically adjusted to compensate for wear of the parts.

Another object of this invention is to provide a tie rod joint adapted to connect the tie rod with both a drag link and a front wheel steering arm.

Another object of this invention is to provide a joint having oppositely disposed stud elements extending therefrom.

A further object of this invention is to provide a tie rod joint having a pair of stud elements seated in a single housing and having bearing parts that are automatically compensated for wear.

Another object of this invention is to provide a novel compound joint having a pair of studs freely rotatable about their own axis and tiltable through a wide arc.

Other and further objects of this invention will be apparent to those skilled in the art from the following detailed description of the accompanying sheet of drawings illustrating a preferred embodiment of this invention.

On the drawing:

Figure 1 is a broken, fragmentary, elevational view of a steering unit having a joint therein according to this invention.

Figure 2 is a fragmentary cross-sectional view, with parts in elevation, of a joint construction according to this invention showing the manner in which the joint connects a tie rod to both a drag link and an automobile front wheel steering arm.

Figure 3 is a fragmentary sectional view, with parts in elevation, of a modified form of joint construction according to this invention.

As shown on the drawing:

In Figure 1 the reference numeral 10 indicates a conventional form of tie rod used on automotive vehicles. The tie rod 10 is secured at the ends thereof to the shanks 11 and 12 of tie rods 13 and 14 respectively.

Clamp members 15 are provided to lock the shanks 11 and 12 in adjusted screw-thread relation in the tie rod 10.

The tie rod joint 13 may be of any conventional type provided with a single stud 16 extending therefrom. The stud 16 is adapted to receive thereon the end 17 of a steering arm 17a from a front wheel of an automotive vehicle.

The tie rod joint 14 is of a form provided by this invention having a pair of oppositely disposed studs 18 and 19 extending from the ends thereof. Stud 18 is adapted to receive thereon the end 20 of a drag link 21 from a steering rod (not shown). The stud 19 is adapted to receive thereon the end 22 of a front wheel steering arm 22a.

In Figure 2, the shank 12 of the tie rod joint 14 is shown inserted into the tie rod 10. The tie rod end is slotted as at 10a to permit the clamp 15 to tighten the rod end around the shank 12 after the proper threaded adjustment has been made in the rod.

The tie rod joint 14 comprises a housing member 30 having a cylindrical opening 31 extending therethrough. The bottom of the housing is provided with an inturned flange 32 defining an opening 33 through which the stud 19 freely extends.

A seating element 34 is placed in the housing 30 against the inturned flanges 32 as shown. The seating element 34 is provided with an inside segmental spherical bearing surface 35.

The stud 19 has formed thereon a segmental ball end 36 having a flat bottom 37 with a countersunk portion or well 38 in the center thereof, for receiving one end of a coiled spring 39.

The stud 18 is identical with the stud 19 and thus is provided with a segmental ball end 40 having a flat bottom 41 with a countersunk portion or well 42 in the center thereof for receiving the other end of the coil spring 39. A seating element 43 similar to the seating element 34 is provided with an inside segmental spherical bearing surface 44 for cooperating with the ball end 40. The top end of the housing 30 is peened over as at 45 for holding the seating element 43 therein and for defining an annular opening 46 through which the stud 18 may freely extend.

Washers 47 are provided on each end of the housing 30 for preventing loss of lubricant from the interior of the housing or ingress of dirt. The washers 47 are held in position by tapered coil springs 48 compressed between the washers and the end 22 of the steering arm 22a or the end 20 of the drag link 21. The drag link end 20 is held on the stud 18 by a nut 49, while the steering arm end 22 is held on the stud 19 by a nut 50.

The tie rod joint 14 therefore comprises two oppositely disposed studs 18 and 19 extending from opposite ends of the housing 30. A pair of seating elements 34 and 43 having inside segmental bearing surfaces are mounted in spaced relation in the ends of the housing. The segmental ball ends of the stud members have flat bottoms 37 and 41 provided with aligned wells 38 and 42 for receiving opposite ends of a coil spring 39 held under compression. It will readily be appreciated that the studs 18 and 19 are freely rotatable about their own axis and may be tilted throughout a large angular arc. Unequal movements of the drag link and the steering arm relative to the tie rod are thus readily permitted. Any wearing of the ball ends or seating elements is automatically compensated for by the spring 39 which constantly urges the stud ends into a true bearing fit with the seat elements.

In Figure 3 there is illustrated another form of tie rod joint according to this invention having a housing 60 provided with a laterally extending shank 61 threaded into a tie rod 62. The tie rod end is slotted as shown at 62a so that the shank 61 may be clamped in adjusted threaded relation in the tie rod 62 by means of a clamp 63.

The housing 60 is provided with a cylindrical opening 64 extending therethrough. An inturned flange 65 at the bottom of the housing 60 defines an opening 66 through which a stud 67 may freely extend.

The top end of the housing 60 is provided with a groove 68a for receiving a ring member 68 defining an opening 69 through which a stud 71 may freely extend. The ring member 68 is securely held in the housing by peening the end of the housing over the top of the ring as shown at 70.

The stud 67 has formed on its end thereof a segmental ball 72 having a flat bottom 73 provided with a well 74 for receiving one end of a coiled spring 75.

The stud member 71 likewise has formed thereon a segmental ball end 76 provided with a flat bottom 77 having a well 78 in the center thereof. The wells 74 and 78 are in vertical alignment and are adapted to receive the opposite ends of a coil spring 75 which urges the studs 67 and 71 outward from the center of the housing.

A plurality of ball bearings 79 are adapted to roll in the opening 64 of the housing between the flange 65 and the segmental ball end 72 of the stud 67. Likewise a plurality of ball bearings 80 are adapted to roll freely in the housing 67 between the segmental ball end 76 of the stud member 71 and the ring member 67.

This arrangement provides a free rotary movement of the studs 67 and 71 about their own axis on the bearing surfaces provided by their segmental ball ends 72 and 76 respectively, and the ball bearings 79 and 80 respectively. The spherical shape of the ball ends 72 and 76 also permits a free angular or tilting movement of the studs 67 and 71 relative to the housing.

The spring 75 constantly urges the ball ends 72 and 76 of the studs 67 and 71 against the ball bearings 79 and 80 respectively and provides an automatic compensating adjustment for wear of the bearing surfaces.

It is obvious that the feature of maintaining a pair of oppositely disposed studs in proper bearing relationship in a tie rod housing may be applied to specific forms of tie rod construction other than the two modifications shown in our drawing without departing from the scope of this invention. Our invention makes possible the elimination of heretofore necessary elements and provides a safe but simple steering unit for automotive vehicles which is automatically adjusted to compensate for wear and thus will not rattle or permit front wheel shimmy even after considerable use.

Having now described our invention, we are aware that many changes may be made and numerous details of construction may be varied through a wide range without departing from the principles of this invention, and we therefore do not purpose limiting the patent granted hereon otherwise than necessitated by the prior art.

We claim:

1. A tie rod joint comprising a housing having means for connection with a tie rod, said housing having a cylindrical opening extending therethrough, an inturned flange on the bottom of said housing for defining an annular opening, a stud member extending through said opening, a ball end on said stud, a seating element pressed against said flange having a segmental spherical bearing surface cooperating with the ball stud end, an annular retaining member on the other end of said housing defining an annular opening, a second stud extending through said opening, a ball end on said second stud, a second seating element, pressed against said retaining member, having a segmental spherical bearing surface for cooperating with the ball end of said second stud, and a coil spring acting against the ends of said stud members to maintain the same in operative bearing position in the seat elements.

2. A tie rod joint having a casing provided with means for connection to a tie rod, said casing forming an outer raceway, a plurality of ball bearings therein, a pair of oppositely disposed stud elements extending from the ends of said casing, ball ends on said studs forming inner raceways for the ball bearings, and means urging said ball ends into contact with said ball bearings for holding the studs in operative position in the casing.

3. A tie rod joint comprising a housing provided with means for connection to a tie rod, said housing having a bore extending therethrough and segmental spherical bearing surfaces therein at each end of said bore, studs projecting freely from each end of said bore having segmental ball ends seated in said bearing surfaces, said ball ends also having wells formed in the central portion of the bottoms thereof and a coiled spring seated at both ends thereof in said wells and maintained under compression to urge the ball ends of the stud into full bearing relation with the bearing surfaces in the housing.

4. A tie rod joint comprising a housing having a cylindrical bore extending therethrough, means defining restricted annular openings at both ends of said bore and providing shoulders at each end of the housing, studs extending freely through each opening to the bore, said studs having segmental ball ends in the housing, ball bearings disposed between said ball ends and said housing in abutting relation to said shoulders, said segmental ball ends of the studs having wells formed in the central portion of the bottoms thereof and a coiled spring seated at each end thereof in said wells and maintained under compression to urge the studs apart into bearing relation with the ball bearing and thereby maintain a three point contact of the ball bearing with the ball ends of the studs, the inside walls of the housing and the shoulders of the housing respectively.

5. A tie rod joint comprising a housing having a laterally extending shank for connection to the end of a tie rod, said housing having a bore extending therethrough and bearing surfaces therein at each end of said bore, studs projecting freely from each end of said bore having segmental ball ends cooperating with said bearing surfaces and resilient means urged against the bottoms of said ball ends for maintaining the studs in proper assembled relation in the housing.

GEORGE H. HUFFERD.
DANIEL H. NEWEY.